Patented Aug. 19, 1947

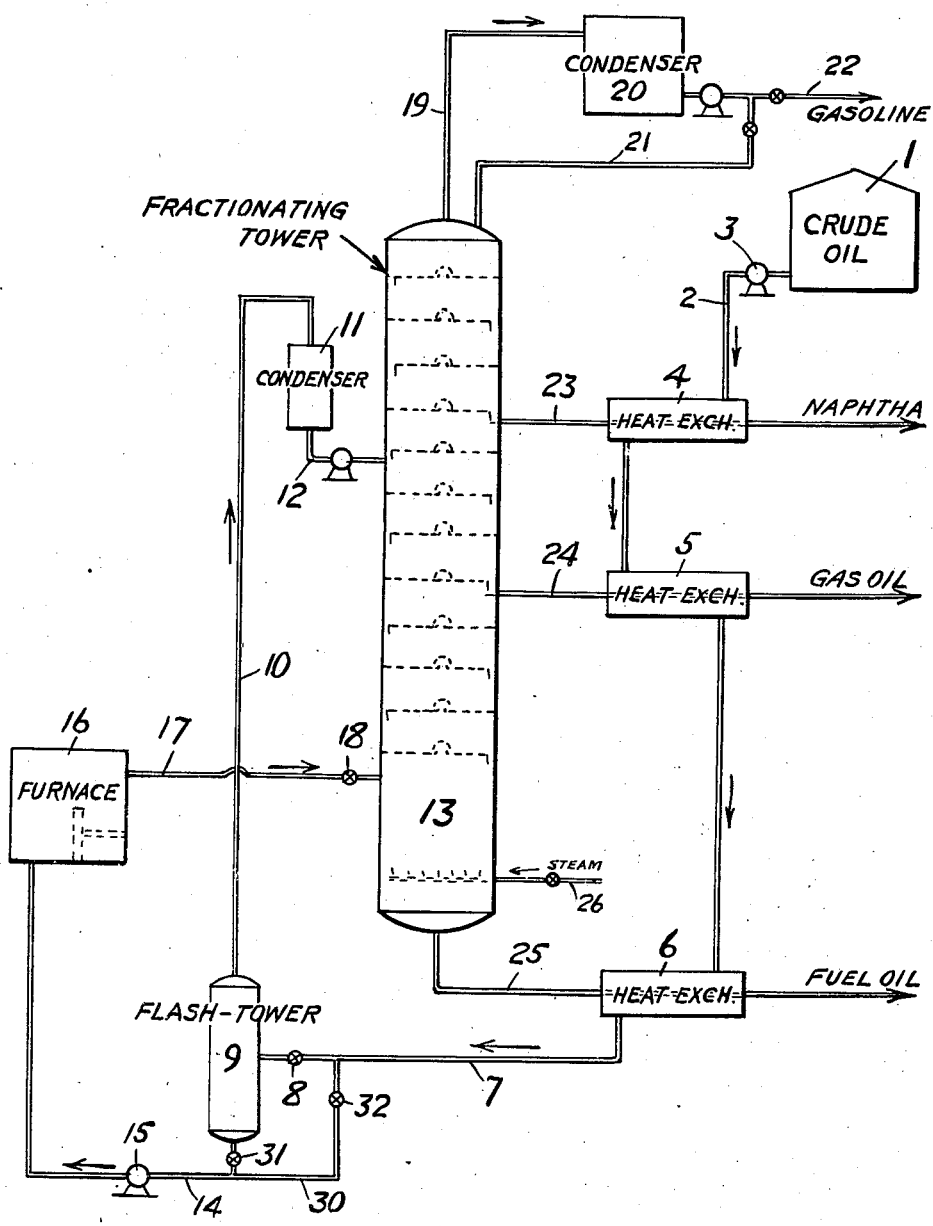

2,426,110

UNITED STATES PATENT OFFICE 2,426,110

DISTILLATION OF CRUDE PETROLEUM

Wilmer E. McCorquodale, Jr., Ardentown, Del., and Lloyd G. Magill, Chester, Pa., assignors to Sun Oil Company, Philadelphia, Pa., a corporation of New Jersey Application October 14, 1942, Serial No. 462,040

1 Claim. (Cl. 196—73)

The present invention relates to a method of distillation and is particularly directed to an improved method of distilling materials such as crude petroleum oils having a relatively wide boiling range in order to produce therefrom desired products.

It is common practice in fractional distillation of crude petroleum and similar substances to heat the material to be distilled by heat exchange with the hot products from the process, after which the lower boiling fractions are separated from the intermediate and higher boiling constituents of the crude by flash distillation. Those constituents of the crude, which are not vaporized by flashing, are then heated by indirect heat exchange in a furnace, the heated products introduced into a vaporization zone, frequently a fractionating tower, and the vapors evolved fractionated into several liquid fractions of varying boiling points. The vapors of the lowest boiling constituents which are separated by flash distillation after heat exchange with the hot products from the process are frequently introduced into the same fractionating tower as the vapors from the remainder of the crude and all the products are fractionated in the same tower.

This invention is directed to an improvement in a distillation process of the type outlined above and in accordance with the present invention the crude oil is first heated by heat exchange with the hot products from the process, the light gasoline vapors are then removed by flashing and the unvaporized, intermediate and higher boiling, constituents are heated in a furnace and introduced into a fractionating tower wherein they are fractionated. The vapors of the light gasoline separated by flashing are condensed and the condensate is introduced into the same fractionating tower employed for fractionating the remainder of the crude. We have discovered that if the light gasoline vapors are condensed and introduced into the fractionating tower as a liquid condensate the same tower is able to handle a substantially greater throughput than is possible when the light gasoline vapors are introduced into the tower in vapor phase. We also discovered that the furnace of a given distillation unit is able to handle a greater throughput if the light gasoline vapors are removed before the remainder of the crude is introduced thereinto. Thus, by a minor and simple modification the throughput of a given distillation unit can be substantially increased.

For a better understanding of the present invention reference should be made to the accompanying drawings in which the single figure is a diagrammatic flow chart of apparatus suitable for practicing the present invention.

Referring now to the drawings 1 designates a storage tank for crude oil to be distilled. The crude oil is removed from tank 1 through line 2 by pump 3 and pumped through heat exchangers 4, 5 and 6 wherein it is heated by indirect heat exchange with the hot products from the process. From heat exchanger 6 the heated crude oil flows through line 7 having pressure reducing valve 8 therein to flash tower 9 wherein a relatively low pressure, substantially atmospheric, is maintained. In tower 9 the lowest boiling constituents of the crude oil, light gasoline, vaporize and the vapors are removed overhead through line 10 and flow to condenser 11 wherein they are condensed and the condensate introduced through line 12 into fractionating tower 13. The unvaporized portion of the crude is removed from flash tower 9 through line 14 and pumped by pump 15 through the heating coil in furnace 16, the oil being heated during its passage through the furnace to the temperature necessary to provide the required amount of heat for fractionating the crude into such portions as are desired. From furnace 16 the heated oil flows through line 17 having pressure reducing valve 18 therein to lower portion of fractionating tower 13. The tower 13 is of conventional design and may be provided with a number of bubble trays therein, the vaporized portion of the heated crude rising upwardly through the bubble trays in the usual manner and being fractionated in the usual manner in tower 13. From the top of tower 13 the lightest vapors of the crude are removed through line 19 and flow to condenser 20 wherein they are condensed, a portion of the condensate is returned through line 21 to the top of tower 13 to act as reflux, while the remainder of the condensate is removed from the process through line 22 and may be pumped to storage or suitable rectification equipment. Several side cuts may be taken in tower 13, and, as illustrated in the drawings, a naphtha side cut may be removed through line 23, the hot naphtha flowing through heat exchanger 4 wherein it is cooled by indirect heat exchange with the whole crude oil flowing therethrough. A gas oil side cut may be removed through line 24, the hot gas oil flowing through heat exchanger 5 wherein it is cooled by heat exchange with the whole crude oil flowing therethrough. From the bottom of tower 13 the residual fuel oil may be removed through line 25 and this product will flow through heat exchanger 6 in indirect heat exchange with the whole crude oil flowing therethrough, the fuel oil in line 25 being cooled and the whole crude is further heated.

One of the principal advantages of operating a distillation unit in accordance with the present invention is that with a given throughput rate the vapor velocities in the fractionating tower are substantially reduced over the vapor velocities which would prevail if no flashing operation were employed or if a flashing operation were included but the flashed vapors were added to the fractionating tower in vapor phase. The following specific example will serve to illustrate this and other advantages of the invention.

An East Texas crude oil was withdrawn from storage tank 1 at a temperature of 74° F. and was pumped through heat exchanger 5 wherein it was heated to a temperature of 189° F. by the indirect heat exchange with hot gas oil which entered the exchanger at 445° F. and was cooled to 145° F. From heat exchanger 5 the crude flowed to heat exchanger 6 wherein it was heated to a temperature of 280° F. by indirect heat exchange with fuel oil which entered heat exchanger 6 at a temperature of 528° F. and left at a temperature of 270° F. From heat exchanger 6 the heated crude flowed to flash tower 9, the pressure on the crude being reduced to substantially atmospheric pressure on passing pressure reducing valve 8. Substantially ten per cent of the crude was vaporized and the vapors were withdrawn overhead through line 10 to condenser 11 and introduced into fractionating tower 13 through line 12. The temperature of the vapors withdrawn through line 10 and of the reduced crude withdrawn from flash tower 9 through line 14 was 267° F. The reduced crude flowing through line 14 was heated in furnace 16 to 577° F. and the heated reduced crude introduced into fractionating tower 13.

It was found that in the particular distillation unit being studied that, when the charge rate was 840 barrels per hour of whole crude, the maximum vapor velocity in the tower when operating in accordance with the present invention was 836 barrels per hour (expressed as liquid at 60° F.). In the same distillation unit when operating on the same crude but with the flash tower 9 omitted, the oil flowing directly from line 7 through line 30 to line 14 by closing valves 8 and 31 and opening valve 32, the maximum vapor velocity in the tower 13 was 1108 barrels per hour. While in the same distillation unit employing the flash tower 9 but omitting the condenser 11 and introducing the flashed vapors in vapor phase into fractionating tower 13 the maximum vapor velocity was 980 barrels per hour. It will thus be seen that the present invention permits a substantial decrease in the vapor velocities in the tower or a substantial increase, 20% or more, in the throughput which a given fractionating column can handle and still operate efficiently. It should further be noted that the furnace will not need to be redesigned since if the light vapors are flashed from the crude before it is introduced into the heating coil in the furnace, a substantially smaller amount of material flows through the furnace and therefore it can be heated to a higher temperature and thus the throughput of the entire unit is substantially increased.

We claim:

In the process of fractionally distilling crude petroleum in which the crude is preliminarily heated, the pressure thereon then reduced, and by flash distillation the crude is separated into only two products, namely, a vaporized low boiling product which is removed from the flash distillation zone in vapor phase and introduced directly and without previously being subjected to fractionation into a fractional distillation zone and a reduced crude comprising all the constituents of the crude which are not vaporized and which is heated to effect its partial vaporization and then introduced into the same fractional distillation zone at a locus substantially below the locus of introduction of said separated light product, and from which fractional distillation zone its fractional products are separately withdrawn: the herein described improvement which comprises subjecting the separated light vaporous product of flash distillation, while still in vapor phase and prior to any fractionation thereof, to a reduced temperature effective to condense condensible constituents so that said separated light product is introduced into the fractional distillation zone mainly as a liquid constituent.

WILMER E. McCORQUODALE, Jr.
LLOYD G. MAGILL.

REFERENCES CITED

The following references are of record in the file of this patent:

UNITED STATES PATENTS

| Number | Name | Date |
|---|---|---|
| 1,730,891 | Leslie et al. | Oct. 8, 1929 |
| 1,815,127 | Dickson | July 21, 1931 |
| 1,997,675 | Bahlke et al. | Apr. 16, 1935 |
| 2,160,103 | Kraft et al. | May 30, 1939 |
| 2,295,256 | Brugma | Sept. 8, 1942 |
| 1,882,568 | Hall | Oct. 11, 1932 |